July 6, 1926. Re. 16,379
A. B. MERRILL
METHOD AND APPARATUS FOR MAKING TIRES
Original Filed Nov. 7, 1921
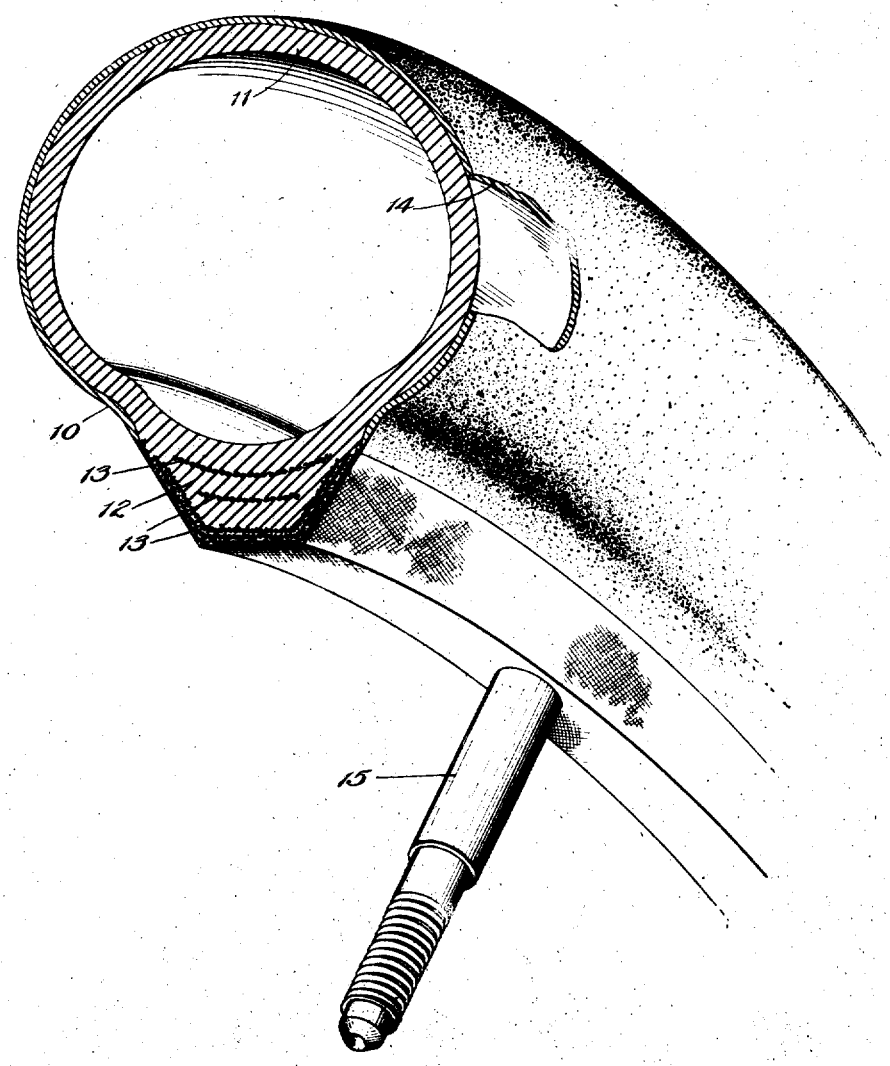
Inventor
Allan B. Merrill.
By Robert W. Peerson Atty Reissued July 6, 1926. Re. 16,379

UNITED STATES PATENT OFFICE.

ALLAN B. MERRILL, OF AKRON, OHIO, ASSIGNOR TO THE B. F. GOODRICH COMPANY, OF NEW YORK, N. Y., A CORPORATION OF NEW YORK.

METHOD AND APPARATUS FOR MAKING TIRES.

Original No. 1,435,970, dated November 21, 1922, Serial No. 513,319, filed November 7, 1921. Application for reissue filed December 13, 1923. Serial No. 680,541.

This invention relates to methods and apparatus for making tires, and more particularly to the art of vulcanizing tires wherein the tire is held distended, during vulcanization, by an expansible core, commonly called an air-bag or a water-bag. My object is to increase the life of these bags by delaying the migration of an excess of sulphur into the walls of the bag from the tires being vulcanized, which eventually hardens these walls and causes the bag to crack.

The accompanying drawing is a sectional, perspective view of a water bag embodying a preferred form of my invention.

Referring to the drawing, 10 designates the bag as a whole, of which the main body 11 is a thick-walled, annular tube of vulcanized soft rubber having at its inner periphery a bead-engaging base portion 12 of vulcanized rubber reenforced with strips of fabric 13. The outer surface of the tube 11, except at the reenforced base 12, is covered with a layer of rubber initially containing very little or no sulphur, commonly referred to as a non-vulcanizing compound. This outer layer may either be a veneer of sheeted gum 14 or a coating of rubber cement painted on the bag and allowed to dry, or both. Finely-divided mica, indicated in the drawing by stippling, is preferably applied to the surface of the layer 14 to prevent the latter from sticking to the inner surface of the tire. 15 is a valve stem such as is used in inner tubes for pneumatic tires for supplying fluid under pressure to the interior of the bag.

In use, the layer 14 absorbs the sulphur emanating from the tire body and prevents it from reaching the main body 11 of the bag and overcuring the latter. As the outer layer initially contains but a very small quantity of sulphur, if any, it is capable of absorbing such sulphur as is given off to it by the tire body in a large number of vulcanizing heats before it becomes overcured. The bag, nevertheless, withstands handling and retains its shape by reason of the vulcanized condition of the thick-walled body-portion 11 and the base 12.

The bag may be made in any known or suitable manner, as by first forming the thick-walled tube 11 of a vulcanizable compound on a straight mandrel, removing it from the mandrel and applying the valve stem 15 thereto, joining the ends of the tube to form an annulus, inflating it, applying the base portion 12 thereto, stretching onto said annulus the non-curing sheet of gum 14 and "stitching" the latter in place, subjecting the entire structure to vulcanizing heat in a mold while subjecting it to internal fluid pressure, painting the surface of the molded bag with a thin rubber cement containing finely-divided mica, and permitting said cement to dry. I do not limit myself, however, to this or any other method of constructing the bag, nor do I wholly limit myself to the use of mica or to the use of cement as a vehicle for applying a non-adhesive substance.

I may use a small amount of sulphur, preferably less than 2%, in the veneer 14, with or without a filler or an accelerator, for the purpose of stiffening it, since the degree of vulcanization which results therefrom in said veneer is comparatively small and the veneer is still capable of absorbing a substantial quantity of sulphur and withstanding many successive heats before it becomes overcured.

In practice I find it advisable to apply a new coat of the mixture of mica and cement before each cure, as a safeguard against sticking of the bag to the tire and to retard to some extent the migration of sulphur.

When the outer surface of the veneer 14 eventually becomes overcured and begins to crack, a part or all of it may be buffed off and replaced by a new layer of the substantially sulphur-face compound, and as the body portion 11 contains little if any more sulphur than it did originally the bag again may be used for a large number of cures. This process of renewing the bag is not a part of my invention, but after such renewal, as well as before, the bag itself embodies my invention.

My invention is subject to modifications, and is not wholly limited, for example, to making the sulphur less or low-sulphur layer as a part of the bag.

I claim:

1. An expansible core for vulcanizing rubber articles, said core comprising a wall of vulcanized rubber and a surface layer of relatively non-vulcanizing material thereon adapted to prevent migration of sulphur to said wall from the article being vulcanized.

2. An expansible core for vulcanizing rubber articles, said core comprising a wall of vulcanized rubber, and a layer of sulphur-absorbing material thereon, said layer extending substantially to the work contacting surface of said core.

3. An expansible core for vulcanizing rubber articles, said core comprising layers of rubber of different sulphur content, the outermost layer of rubber in said core initially containing less than 2% of sulphur.

4. An expansible core for vulcanizing rubber articles, said core comprising a wall of vulcanized rubber and a layer of substantially sulphur-free rubber thereon, said layer constituting the outermost layer of rubber in said core.

5. An expansible core for vulcanizing rubber articles, said core comprising a rubber wall initially containing a smaller proportion of sulphur at the work-engaging surface thereof than in a region relatively remote therefrom.

6. An expansible core for vulcanizing rubber articles, said core comprising a stretchable wall, a layer of substantially sulphur-free rubber thereon, said layer constituting the outermost layer of rubber in said core, and material associated with said layer adapted to prevent the latter from sticking to the work.

7. An expansible core for vulcanizing rubber articles, said core comprising a stretchable wall, a layer of substantially sulphur-free rubber thereon, said layer constituting the outermost layer of rubber in said core, and finely-divided mica upon said layer.

8. Apparatus for vulcanizing pneumatic tires comprising an annular tube of vulcanized rubber, a coating of substantially sulphur-free rubber compound thereon, said layer constituting the outermost layer of rubber in said core, and means for preventing said coating from adhering to the surface of the tire when the latter is vulcanized in contact with said coating.

9. The method of making a rubber tire which comprises maintaining an expansible, rubber core distended within the tire during vulcanization thereof while preventing over-vulcanization of said core by the presence of a layer of material adapted substantially to prevent migration of sulphur from the tire to the vulcanized parts of the core underlying said layer.

10. The method of making a rubber tire casing by the expansible-core process which consists in interposing a substantially sulphurless layer of rubber between the tire casing and the expansible core upon which the casing is vulcanized.

11. The method of making a rubber tire which comprises maintaining an expansible rubber core distended within the tire during vulcanization thereof while preventing over-vulcanization of said core by the presence of a layer of substantially non-vulcanizing rubber adjacent to the vulcanized rubber of said core.

In witness whereof I have hereunto set my hand this 10th day of December, 1923.

ALLAN B. MERRILL.